March 14, 1944.  W. V. MAZE  2,344,158
TIRE VULCANIZER
Filed Dec. 4, 1941
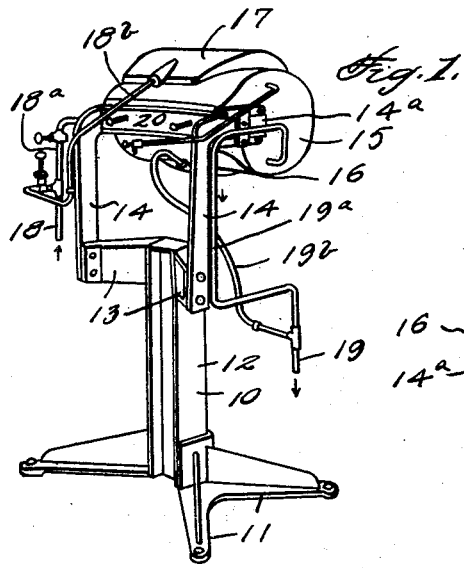
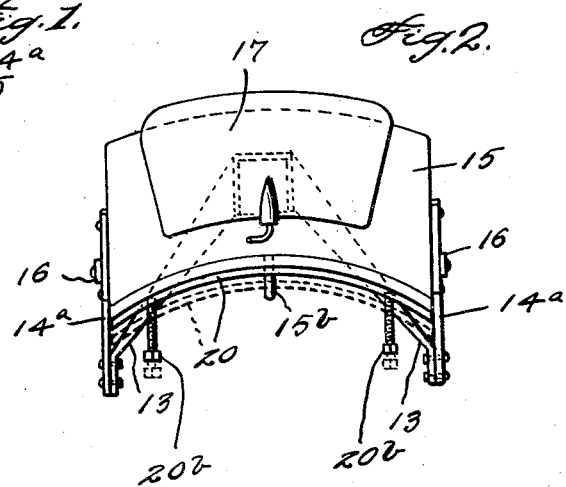
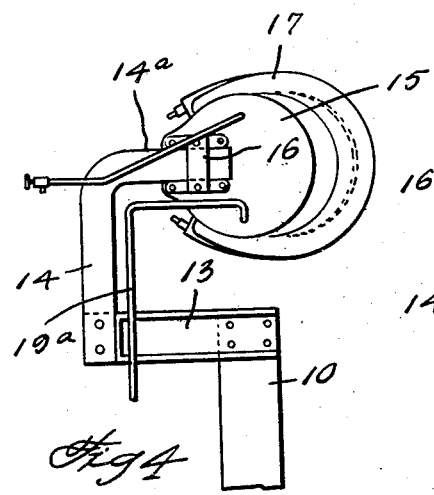
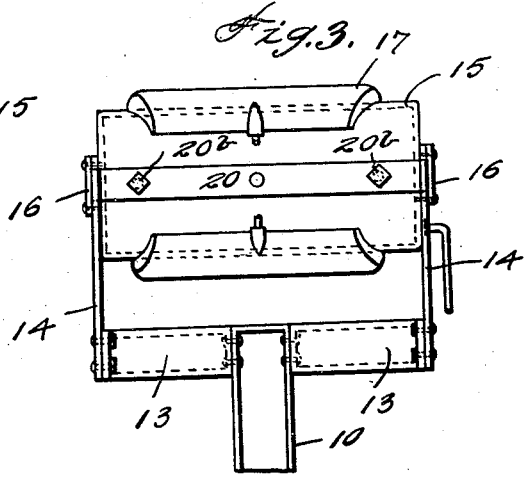
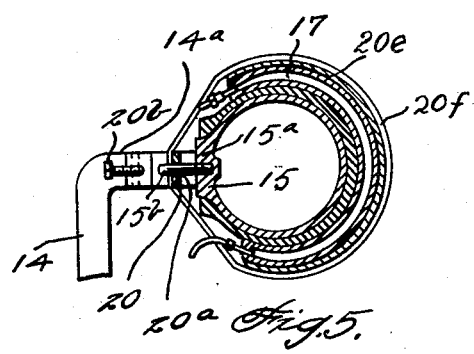
Inventor
William V. Maze
By
Attorney Patented Mar. 14, 1944

2,344,158

UNITED STATES PATENT OFFICE 2,344,158

TIRE VULCANIZER

William V. Maze, Anderson, Ind., assignor to C. E. Miller Manufacturing Corporation, Anderson, Ind.

Application December 4, 1941, Serial No. 421,663

2 Claims. (Cl. 18—18)

The present invention relates to improvements in tire vulcanizers, and more particularly to vulcanizers for curing the casings of large dimensioned tires such as are commonly used, for instance, in farm tractors and road machinery service and in which the tires operate under "low pressure" conditions.

Tires for service such as indicated, for instance, are of large cross-sectional dimensions—tire sizes of 9.00 to 13.50, for instance—and since they operate under what are termed "low pressure" conditions, the casings employed therewith are subject to difficult service conditions, with the result that they become damaged more readily than casings used in the usual or general service. The casings are necessarily of staunch construction, tending to stiffness, and the yield of the tire, due to the low pressure, places strains on the casing structure such as can cause various difficulties, such as cracks, etc., more or less isolated. Since the trouble is generally localized in the casing, the latter is restored to service by repairing at the damaged point or points, with the repair such as to require vulcanization or curing action in the zone of such point or points.

Such difficulties are not uncommon with ordinary tires, and vulcanizing apparatus for repairs have been developed and are used commercially as regular garage service facilities. However, such apparatus is incapable of meeting conditions set up by casing dimensions such as indicated by the above range, and it is necessary to provide special apparatus for this service. The vulcanizing apparatus for normal service is somewhat expensive, the cost is warranted because of the millions of vehicles making up the normal dimensioned tire field as potential customers for the apparatus; if the attempt were made to increase the dimensions of such apparatus to take care of these larger dimensions, the cost of the apparatus would be largely increased; since the field of potential customers is somewhat limited, the large installation cost of the vulcanizing apparatus for this specific purpose would be unwarranted unless a large amount of repair work were made available, a condition which would tend to limit the activities to but a few points and require the user of the tires to ship his casings for repair to distant points, and either wait for the return, or carry spare casings.

It is in this condition that the present invention has been developed with a view to the production of an apparatus of comparatively low cost characteristic, and yet be capable of efficiently meeting the onerous conditions set up by the tire dimensions and low pressure service conditions of this special field, an apparatus the cost of which would be warranted by the smaller garage service stations, and thus provide greater convenience for the users of this type of tires.

In addition, casings of this type having their service operation under low pressure conditions of the tire, may produce difficulties such that the normal service casings do not produce, and hence, the expedient of simply enlarging the dimensions of the general commercial vulcanizers, may not be sufficient, since a vulcanizer for this special service must be capable of meeting all of the types of difficulties which could develop under the conditions. The present invention has been developed in a form which will meet this condition as well as the low cost characteristic referred to.

The general object of the invention, therefore, is to provide an apparatus for this special purpose which will operate at maximum efficiency, ensure proper action on the casing, and be of such construction as to present a reasonably low cost of production. Specific objects pertain to construction, and these will be disclosed in connection with the actual description of the invention which follows.

To these and other ends, therefore, the nature of which will be better understood as the invention is hereinafter disclosed, said invention consists in the improved construction and combination of parts as more fully described hereinafter, illustrated in the accompanying drawing, and more particularly pointed out in the appended claims.

In the accompanying drawing, in which similar reference characters indicate similar parts in each of the views;

Fig. 1 is a perspective view of an apparatus designed for this purpose and illustrating the present invention.

Fig. 2 is a plan view showing portions of the apparatus.

Fig. 3 shows a side elevation of portions of the apparatus.

Fig. 4 presents an end view of portions of the apparatus, and

Fig. 5 is a cross-sectional view of the head zone of the apparatus under service conditions.

The purpose of repairs of this nature is to restore as far as possible the original condition of the casing; this cannot be completely done, due to the fact that the casing is of a composite nature and includes fabric; however, it is possible to restore to some extent the characteristics of the initial character by the use of materials the same as or equivalent to the rubber content of the casing, if the substituted material can be united to the undamaged portion of the tire. Hence, when a break or other damage is found, the substitute is applied at the point of damage after which the zone is subjected to vulcanizing heat and pressure, which tends to sufficiently cure and shape the inserted material and soften opposing edges of the substitute and damaged part to enable the uniting thereof with a part of the substitute possibly penetrating through interstices of the fabric of the casing to additionally anchor the substitute. This is the well-known method of providing repairs, and is followed in the present invention, with the heat and pressure provided by the vulcanizer.

Obviously, therefore, the vulcanizer must be able to develop the desired amount of heat and pressure, and must be of such form that during the shaping, softening or vulcanizing period, the characteristics of a mold must be provided to prevent change from a desired form, etc., within the zone which is undergoing the repair treatment. In a repair structure for garage purposes a complete mold structure could not be utilized, due to the fact that it may be necessary to treat many different forms of casings, each of which would require an individual mold, and hence require a large number of molds under conditions in which the need for their use is uncertain and dependent on conditions not controllable by the operator; this would involve possibly unnecessary expense for molds. Hence, a vulcanizer for this service should be capable of serving all of the possible trade with a minimum of changes; in the present invention, one of the forms or heads will take care of all sizes and shapes in the range of 9:00 to 11:25, inclusive, while a second form of head will take care of sizes ranging from 11:25 to 13:50, it being possible to quickly substitute one form or head for the other in the general assemblage; the machine is normally supplied with the lower range form or head, since that will include the major number of tires in use; the upper range head is an added structure that can be purchased as such and thus provide a vulcanizing apparatus capable of efficiently repairing all tires within the combined ranges of sizes.

This result is made possible through the fact that the inner faces of all casings are smooth and generally of similar shape and dimensions for a particular size regardless of the fact that the outer faces may vary with different tire manufacturers. As a result, the inner member of the head may be of metal and therefore rigid. The outer member of the head, however, must be capable of conforming to various outer configurations of the casings being treated, and must therefore be capable of adapting itself to the conditions of service, for which reason the outer member is made more or less flexible and pliant; in the present invention the outer member is in the form of a heavy, flat rubber steam bag. Since the outer member is thus of flexible characteristic, provision is made to provide the pressure needed for the shaping and vulcanization, by applying to the outer side of the bag—after the latter is positioned on the casing then positioned on the metallic inner member—a number of wrappings of suitable tape, the wrappings extending around the head, and being capable of being made tense by an adjustable device; hence, when steam is admitted to the bag, the wrappings prevent expansion of the outer side of the bag, so that the bag expansion can only be on the inner side which is in contact with the positioned casing. As a result, the inner face will conform to the outer face of the casing and will apply the pressure value on to the casing as well as provide the heat for the outer face of the casing, similar to the action of a metallic mold section.

Structurally, the head is carried by a support 10 of fabricated metal, having an expanded skeleton base 11 designed to amply support the vulcanizing apparatus and prevent upsetting, the support including a central vertically-rising standard 12 of suitable length and which is provided with a pair of laterally-extending arms 13, these being inclined rearwardly. Each arm carries a riser 14 the upper portion of which is led forwardly, as at 14a, to receive and support the mandrel portion 15 of the head. As a result of this arrangement, the mandrel is located above and in spaced relation with the standard 12, but lies generally over such standard, and tends to keep the apparatus steady in service.

The mandrel 15 is in the form of a hollow metallic body of suitable length—21 inches, for example—and comparatively thin-walled excepting at its rear zone. A cross-section of the mandrel presents the periphery as conforming generally to the normal inner periphery of a casing on a cross-section of the latter, the wall being thickened at the rear, as at 15a to project through the inner channel of the casing being treated, the periphery at such rear being shaped in conformity with the end zones of the casing cross-section, so that when the latter is positioned on the mandrel the inner wall of the casing will lie in direct contact with the mandrel. In the lengthwise direction, the mandrel has its periphery curved in general conformity to the similar curvature of the inner wall of the casing. The mandrel is secured to the risers at the closed ends of the mandrel, suitable means, such, for instance, as straps 16 with expanded bases, being secured to the ends of the mandrel with the forwardly-extending risers underlying the straps.

The dimensions of the mandrel may be those of the smaller or the larger size of casings within the particular range which the head is to serve, or it may have an intermediate dimension; both sizes have the same arcuate length. The use of a single mandrel for all sizes within the range is made possible through the fact that while the casing is circular, it is not completely rigid, and can therefore yield; when, therefore, the casing varies in dimension from the mandrel, the flexibility permits the casing to accommodate itself to the conformation of the mandrel, both laterally and longitudinally. This can be done without permanently changing the shape of the casing, although the apparatus is designed to provide vulcanization, due to the fact that the "curing" period is not of sufficient length to affect a large area of the casing, but is sufficient to provide the amalgamation within the break zone; the latter zone has the thickness of the casing wall directly exposed to the material used for the repair, and therefore becomes affected at this point to provide amalgamation without materially affecting other portions of the casing which may be contacting the mandrel.

The outer member of the head is in the form of a heavy flat rubber steam bag 17, designed to overlie the casing positioned on the mandrel. Since the bag is flexible it can be readily positioned. Its length longitudinally of the mandrel is generally less than the length of the mandrel, but obviously is sufficient to cover the zone of the casing which carries the break. The dimensions corresponding to a cross-section of the casing are sufficient to overlie the major portion of such cross-sectional length of the casing periphery, as indicated in Fig. 5. The area of the inner face of the bag, is approximately 100 square inches, a dimension sufficient to provide efficient service to casings in which the repair is warranted.

Both the bag and the mandrel are controllably connected with a source of steam supply, indicated by connection 18, one branch 18a of which leads to the mandrel, with a second branch, 18b, leading to the bag, the latter being arranged to receive the supply preferably at a mid-way point of one end of the bag. The bag and mandrel also each have a connection with a drain 19, through branches 19a and 19b, the arrangement providing for a proper steam supply during the active vulcanizing period, generally about one and one-half hours.

20 indicates a steel bar, flat in cross-section but curved lengthwise to conform generally to the curvature of the rear face of the mandrel, the latter carrying a pin 15b projecting from a mid-portion of such rear face, while the bar 20 carries an opening 20a correspondingly positioned in the bar and which permits the bar to be positioned on and be supported by such pin 15b; the bar extends between the ends 14a of the risers but is not connected thereto. The end zones of the bar are provided with adjusting screws 20b which, through contact with the rear face of the mandrel, permit adjustment of the position of the bar lengthwise of pin 15b.

In addition, a heavy sheet of reinforced rubber 20e is used to overlie the bag and prevent blow-out of the bag; this, with heavy cotton tape 20f of about three-inch width, completes the apparatus.

When the casing is to be repaired, the bag is removed and the casing positioned on the mandrel with the break approximately mid-way of the length of the mandrel. If the break is adjacent to or in the usual non-skid tread zone, carrying the varied configurations, the tread zone which would be affected by the area of the bag has its depressions filled with a mixture of plaster of Paris and water and permitted to set, thus bringing this zone to a common peripheral level. The diametrically opposite side of the casing may be supported on a suitable stand, not shown. When the casing is positioned on the mandrel the uninflated bag is applied about the positioned casing symmetrically-disposed relative to the break being repaired. The sheet of reinforced rubber 20e is then applied on to the bag, after which several turns of the cotton tape 20f as shown in Figure 5 are wrapped about the head, generally spirally, over bar 20, with the ends suitably secured. Bar 20 is then adjusted so as to tighten the tape around the bag, thus leaving the latter within the firm grip of the turns of tape.

Steam is then turned into both the mandrel and the bag, thus causing the bag to expand inwardly under the steam pressure therein, and causing the bag to conform to the shape of the tire periphery, and at the same time provide a heat-conditioning medium for the outer side. With a steam pressure of say 50 pounds, the pressure applied to the positioned casing is approximately 5000 pounds, a pressure sufficient to ensure efficient shaping and vulcanization action. After curing for approximately one and a half hours, the steam is turned off and the apparatus permitted to cool, after which the tension is loosened, the tape and rubber sheet removed, as well as the bag, after which the casing is free to be removed. If the tread zone had been given the plaster of Paris treatment, the plaster is removed.

The apparatus, while of relatively low cost—about one-third of the usual cavity structures employed—is very efficient in operation. The needed pressure and heat is provided in a manner to ensure the desired result, since the opposite faces of the casing wall will be in intimate facial contact with the bag and mandrel throughout the area undergoing treatment, the bag ensuring contact with the shaped external casing face. The casing can be readily positioned, and the assembly made so that the procedure is not difficult. Care is required in wrapping with the tape to ensure that the intimate contact of bag and casing will be had and maintained, but this is not difficult, so that repairs such as breaks in casings of such dimensions can be readily provided under usual service station conditions without the necessity of heavy overhead costs.

As above pointed out, the range of sizes of this type of tires now in commercial use, is too great to permit all to be served by a single head structure. To meet the conditions, the range has been divided, and a second head—bag and mandrel—of larger dimensions, can be used interchangeably with the above described head, the substitution can be made in about ten minutes; hence, between the two heads, it is possible for the garage station to handle all of the commercial sizes of such oversized-tire casings.

While I have shown and described one or more ways in which the invention can be carried into effect, it will be readily understood that changes or modifications therein may be found essential or desirable, and I therefore desire to be understood as reserving the right to make any and all such changes or modifications insofar as the same may fall within the spirit and scope of the invention as expressed in the accompanying claims when broadly construed.

What is claimed as new is:

1. In apparatus for treating tire casings for low-pressure tires of over-size dimensions during repair activities on the casing, wherein the repair material is cured and integrated with the casing by vulcanization, a support, a hollow rigid mandrel carried by the support and dimensioned and contoured to contact and support the inner face of the casing in and in the vicinity of the repair zone, a flexible hollow rubber steam bag dimensioned to overlie and directly contact the outer face of the tread zone of the positioned casing in such repair zone, a reinforced rubber sheet overlying the bag for preventing bag blow-outs, controllable connections from a steam supply source to said bag and mandrel respectively, drain connections from the bag and mandrel, and means for restraining the outward expansion of the bag during steam delivery to the bag to thereby cause the casing to intimately contact the mandrel and the bag to intimately contact such tread zone of the casing with the contacts under high pressure conditions during steam delivery to the bag and mandrel, said support including an extended base section, a standard extending upwardly therefrom, arms secured to the standard and risers secured to said arms, said arms being arranged to offset the risers from the standard in directions to position a mid-point of the mandrel in approximate vertical alinement with the standard, and means for removably connecting the risers to the respective ends of the mandrel.

2. An apparatus for treating tire casings for low-pressure tires of over-size dimensions during repair activities on the casing, wherein the repair material is cured and integrated with the casing by vulcanization, a support, a hollow rigid mandrel carried by the support and dimensioned and contoured to contact and support the inner face of the casing in and in the vicinity of the repair zone, a flexible hollow rubber steam bag dimensioned to overlie and directly contact the outer face of the tread zone of the positioned casing in such repair zone, a reinforced rubber sheet overlying the bag for preventing bag blowouts, controllable connections from a steam supply source to said bag and mandrel respectively, drain connections from the bag and mandrel, and means for restraining the outward expansion of the bag during steam delivery to the bag to thereby cause the casing to intimately contact the mandrel and the bag to intimately contact such tread zone of the casing with the contacts under high pressure conditions during steam delivery to the bag and mandrel, said restraining means including an adjustable bar movable toward and from the mandrel, and a winding of flexible tape about the bag and rubber sheet with the bar within the convolutions, said bar being so positioned that adjustment of the bar away from the mandrel exerts tension on the tape, thus rendering the tape active as a positive restraining element for preventing outward expansion of the bag.

WILLIAM V. MAZE.